United States Patent
Skjaerbaek et al.

(10) Patent No.: US 11,965,488 B2
(45) Date of Patent: Apr. 23, 2024

(54) WIND TURBINE AND METHOD FOR CONSTRUCTING A WIND TURBINE

(71) Applicant: Siemens Gamesa Renewable Energy A/S, Brande (DK)

(72) Inventors: Poul Skjaerbaek, Videbaek (DK); Johnny Soerensen, Videbaek (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 133 days.

(21) Appl. No.: 17/629,805

(22) PCT Filed: Jul. 27, 2020

(86) PCT No.: PCT/EP2020/071167
§ 371 (c)(1),
(2) Date: Jan. 25, 2022

(87) PCT Pub. No.: WO2021/018855
PCT Pub. Date: Feb. 4, 2021

(65) Prior Publication Data
US 2022/0260061 A1    Aug. 18, 2022

(30) Foreign Application Priority Data

Aug. 1, 2019 (EP) .................................. 19189663

(51) Int. Cl.
*F03D 80/80* (2016.01)
*F03D 9/25* (2016.01)
(Continued)

(52) U.S. Cl.
CPC ............... *F03D 80/82* (2016.05); *F03D 9/25* (2016.05); *F03D 13/20* (2016.05); *F03D 13/25* (2016.05);
(Continued)

(58) Field of Classification Search
CPC . F03D 80/82; F03D 9/25; F03D 13/20; F03D 13/25; F03D 13/10; F03D 80/85;
(Continued)

(56) References Cited

U.S. PATENT DOCUMENTS 9,982,659 B1    5/2018 Leonard
2003/0015877 A1*  1/2003 Schlemenat ............ F03D 13/20
                                                        290/55
(Continued)

FOREIGN PATENT DOCUMENTS

CN    102213194 A    10/2011
CN    103 306 901 A    9/2013
(Continued)

OTHER PUBLICATIONS

International Search Report & Written Opinion for PCT/EP2020/071167 dated Oct. 23, 2020.

*Primary Examiner* — Joseph Ortega
(74) *Attorney, Agent, or Firm* — Schmeiser, Olsen & Watts LLP (57) ABSTRACT

Provided is a wind turbine including a tower, a tower adapter attached to the tower and a nacelle attached to the tower adapter, whereby the tower adapter houses at least one electrical device of the wind turbine for conditioning or switching power provided by a generator of the wind turbine.

12 Claims, 3 Drawing Sheets

(51) Int. Cl.
*F03D 13/20* (2016.01)
*F03D 13/25* (2016.01)
*H02K 7/18* (2006.01)

(52) U.S. Cl.
CPC ...... *H02K 7/1838* (2013.01); *F05B 2220/706* (2013.01); *F05B 2230/50* (2013.01); *F05B 2240/912* (2013.01)

(58) Field of Classification Search
CPC ............. H02K 7/1838; F05B 2220/706; F05B 2230/50; F05B 2240/912; F05B 2240/95; Y02B 10/30
See application file for complete search history.

(56) References Cited

U.S. PATENT DOCUMENTS

| | | | |
|---|---|---|---|
| 2011/0248506 A1* | 10/2011 | Ruiz Urien | ............. F03D 80/88 290/55 |
| 2014/0014388 A1 | 1/2014 | Maier | |
| 2018/0313333 A1 | 11/2018 | Lleyda Dionis et al. | |

FOREIGN PATENT DOCUMENTS

| | | |
|---|---|---|
| CN | 208858499 U | 5/2019 |
| DE | 10 2016 219 413 A1 | 4/2018 |
| EP | 2 375 058 A2 | 10/2011 |
| EP | 2 620 644 A1 | 7/2013 |
| EP | 2 910 686 A2 | 8/2015 |
| EP | 3 255 210 A2 | 12/2017 |
| WO | 2018/133965 A1 | 7/2018 |

\* cited by examiner

WIND TURBINE AND METHOD FOR CONSTRUCTING A WIND TURBINE

CROSS-REFERENCE TO RELATED APPLICATIONS

This application claims priority to PCT Application No. PCT/EP2020/071167, having a filing date of Jul. 27, 2020, which claims priority to EP Application No. 19189663.8, having a filing date of Aug. 1, 2019, the entire contents both of which are hereby incorporated by reference.

FIELD OF TECHNOLOGY

The following concerns a wind turbine comprising a tower, a tower adapter attached to the tower and a nacelle attached to the tower adapter. The following also concerns a method for constructing a wind turbine.

BACKGROUND

There are multiple approaches for a constructing wind turbines, especially offshore wind turbines, known in the art. The construction of an offshore wind turbine typically starts by providing a foundation, for example, a gravity foundation, a monopile foundation, a tripod foundation or a jacket foundation. In most cases it is easiest to use a monopile structure which is placed by hammering a steel monopile into the seabed soil. After attaching the foundation to the seabed a transition piece can be installed onto the foundation. Typically, additional time is needed afterwards for the grouting of the transition piece and the curing time of the grout. Afterwards the tower is installed onto the transition piece and the nacelle is afterwards installed on top of the tower. The blades can then be attached to the nacelle, typically using a single blade installation which requires the use of a tool for turning the hub.

Once the components are installed, additional electronics, for example, switch gear and electronics for power conditioning, can be installed into the tower or the transistor piece.

The approach for constructing a wind turbine discussed above is rather elaborate and time consuming. It is also in many cases quite complex to install the nacelle on top of the tower since the tower is typically connected to a yaw gear or bedframe within the nacelle while a canopy or support skeleton of the nacelle often extends well below this attachment point. Therefore, during the attachment of the nacelle, the attachment point needs to be lifted quite a bit higher than its final resting position. This additional lift height to meet the clearance needed can be quite high, which adds to the complexity of the installation and to the requirements of the lifting crane. It can also lead to a relatively high dropping height of the nacelle in case of a malfunction of the crane which might damage the nacelle.

To improve the connection between a tower of the wind turbine and the parts of the wind turbine that rest thereon, the document EP 2 620 644 A1 suggest using a connecting portion that is arranged to interface with a nacelle of a wind turbine. The connecting portion comprises a first flange at an interface to the nacelle and an essentially tubular adapter element on which the first flange is arranged. This adapter element can be considered to be the upper most tower segment of the tower and can be assembled together with a yaw ring of the wind turbine a yaw system, in particular on a ground level before both elements are lifted together up to the level where the adapter is going to be installed. While improving some steps of the wind turbine assembly the manufacture of a wind turbine is still a complex process.

SUMMARY

An aspect relates to a wind turbine that allows for an easier construction, especially for offshore usage.

This aspect is solved by the initially discussed wind turbine, wherein the tower adapter houses at least one electrical device of the wind turbine for conditioning or switching power provided by a generator of the wind turbine.

By housing at least some of the devices used for conditioning or switching power within the tower adapter the installation of this device or these devices can be simplified. Especially the device or devices can already be installed within the tower adapter onshore, which also allows for a testing of the components and the installed configuration prior to installation on the wind turbine. As discussed in more detail below, the tower adapter can already be attached to the nacelle prior to the installation of the nacelle to the tower. This ensures that the attachment point of the component structure of nacelle and tower adapter to the tower is located relatively close to the bottom of this structure, therefore removing the initially discussed need to lift the attachment point well above the final resting position. The use of a tower adapter with the electrical device installed within this tower adapter therefore allows for an easier installation of a nacelle of the tower and at the same time reduces the need to install the electrical device on site, especially offshore, because it can already be pre-installed in tower adapter. Therefore, the inventive design of the wind turbine provides multiple advantages while constructing the wind turbine.

It is especially advantageous when all devices used for power conditioning and/or switching of the power provided by the generator are housed in the tower adapter or in the tower adapter and the nacelle. It can be possible to pre-install the tower adapter to the nacelle and therefore essentially assemble all electrical components of the wind turbine before delivering this structure to the construction side, especially an offshore site. This essentially allows the installation of the complete electrical devices used for power conditioning and switching and potentially some additional devices and elements of the wind turbine in the same step the nacelle is installed. The only step left is a connection of outside power and communication cables.

The device or devices housed in the tower adapter can especially be accessible for a service personal from the nacelle. If the nacelle is accessed by helicopter or by a crane installed to the nacelle it might not be necessary to allow any access of service personal to the inside of the tower or foundation below the tower adapter. This allows the use of a basically empty foundation and tower. Especially the lower part of the tower can be air tight, therefore avoiding any issues concerning corrosion etc.

Since the electrical devices and other relevant equipment can be accessed from the nacelle it is possible that the tower does not need an access door at the bottom of the tower. This avoids a potential weak spot in the construction, for example, a steel construction, of the tower. Depending on the features of the constructed wind turbine and details of the construction process it might still be advantageous to provide an escape hatch at the top level of a tower if needed to potentially allow access to the inside of the tower.

To allow access to the nacelle and therefore potentially to the tower adapter the nacelle can be equipped with a platform for a landing personal via helicopter and/or an, optionally remote controlled, crane that can be used to lift a platform carrying personal to the nacelle.

Switch gear and/or a converter and/or a transformer can be housed in the tower adapter as electrical equipment. It is especially possible that multiple or all instances of the mentioned types of electrical equipment can be housed in the tower adapter. It is also possible to distribute the mentioned electrical equipment, especially all instances of the mentioned types, between the nacelle and the tower adapter. The mentioned equipment can be installed in a controlled environment, for example, an onshore factory, prior to offshore installation.

The wind turbine can comprise at least one power cable for transferring the power generated by the generator to an external facility and/or a communication cable for communication with the external facility, wherein the power cable and/or the communication cable terminate in the tower adapter or in a connector that is attached to the tower and connected to a further cable that is connected to at least one electrical device housed in the tower adapter. In other words, connections to an external facility for communication or power transfer purposes can terminate in the tower adapter or in an area of the tower where they can be easily connected to devices in the tower adapter. It is especially possible that the transferred power or communication signals are not conditioned in any further way within the wind turbine once they leave the tower adapter. This especially allows the avoidance of any equipment for power or signal conditioning below the position of the tower adapter.

The external facility can be a substation or control facility of an offshore or onshore wind park. The power cable can be an array cable for connecting multiple wind turbines, for example, in an offshore or onshore wind park, to substations or the power cable can be used to directly connect the wind turbine to power grid. As discussed in more detail below, during the construction of the wind turbine the array cable can be fixed in the top end of the tower. After the connection of the tower adapter to the tower the array cable can then be connected to a connector of the tower adapter or directly to a device installed in the tower adapter. The same approach can also be used for other power or communication cables.

Alternatively, a connector can be arranged in the top end of the tower and a preinstalled cable in the tower adapter, for example, a jumper cable that can be connected to switch gear installed in the tower adapter, can then be connected to that connector. It can be advantageous to use a common connector or junction box to provide connections for multiple power cables, for example, all array cables, and/or communication cables by a single plug-and-play connection.

The power conditioning provided by the electrical device or devices can include a conversion between AC- and DC-currents, a frequency conversion for AC-currents, a transformation between different voltage levels, etc. Switch gear can be used to disconnect components and/or to disconnect a power cable connecting to the outside facility from the wind turbine. The wind turbine can be connected to multiple power and/or communication cables.

At least one connector in the tower adapter can be connected to a respective power or communication cable and provide power or signals that are already conditioned for the external facility so that no further components that switch or condition the power or that condition signals, especially no active components, of the wind turbine are required after the connection point between the connector and the cable.

The power cables can be provided with connectors to allow a quick plug- and play connection between the respective cable and the tower adapter. T-connectors can be used that allow stacking of multiple connections. In an embodiment, only one cable is connected to each connector.

The communication cables can especially be optical fibre cables. Power and/or communication cables can be pre-installed within the tower, especially prior to the connection of the tower to the foundation. Installation of the power and/or communication cables within the tower can be performed onshore for an offshore wind turbine.

The tower can comprise a cable holder below the tower adapter for holding the power and/or communication cable prior to the installation of the tower adapter. The cable holder can hold a certain length of cable to allow for a connection of the cable to the connector of the tower adapter after the installation. The use of a cable holder enables the performance of some termination work on the cables. Accessories like connectors etc. can be used as required. Connectors and other accessories can be installed prior to the installation of the nacelle which can reduce the installation time and can lower the vessel cost in an offshore installation.

The cable can be installed in the tower prior to the installation of the tower at the site of the wind turbine or pulled into the tower on the construction site and fixed to the cable holder.

As will be discussed in more detail below, it can be advantageous when a service platform is installed below the tower adapter to allow service personal to work in this area. The cable holder can be easily reachable from this service platform. The cable holder can be installed on the service platform or on the wall of the tower above the service platform.

The tower can comprise a service platform below the tower adapter that is accessible via an opening in the tower adapter. The opening in the tower adapter can be closed by a hatch or some other device. It is possible that the tower adapter comprises a platform or a floor that essentially covers the full horizontal area of the tower adapter except for the opening. The service platform can be only accessible form this opening and/or an escape hatch that connects the service platform to the inside of the tower.

The use of a service platform allows for easy access for service personal to the lower part of the tower adapter which can be used during the construction and/or servicing of the wind turbine. The combined use of the tower adapter and the service platform allows for easy servicing of switch gear and cables. It is possible to connect cables that a pre-installed in the tower to connectors of the tower adapter from this platform and/or to use this platform during the attachment of the tower adapter to the tower. the platform can be used to apply a grout to a connection area between tower and tower adapter, to connect these components via welding or bolting, especially using an internal flange, etc. The use of such a service platform is especially advantageous since it can provide a safe working environment for service personal, especially if it essentially covers the full horizontal area of the tower and therefore ensures that equipment or personal cannot drop from the platform.

In an embodiment, the wind turbine comprises an opening connecting the nacelle to the tower adapter. The opening can be provided in the floor of the nacelle and/or a top platform or a roof of the tower adapter. The connection of the nacelle and the tower adapter via the opening facilitates the servicing of the electrical components, since all electrical components can be arranged in a common area formed by the nacelle and the tower adapter. This allows easy and fast servicing over the entire lifetime of the wind turbine. In an embodiment, the opening can be closed by a hatch or a similar device. In a preferred embodiment the tower adapter can be only accessible by that opening and optionally from the service platform discussed above. The tower adapter can therefore be easily accessed from the nacelle and it is possible for service personal to service or exchange an electrical device or other components installed within the tower adapter or to continue to the service platform via the tower adapter to connect or disconnect a power or communication cable.

The tower adapter can also house further components of the wind turbine. The tower adapter can house a battery-back-up device and/or cooling equipment and/or a cable support to support the power and/or communication cable and/or a controller and/or a tower adapter platform. Arrangements of all or part of these components in the tower adapter allow for an easy installation of these components with the tower adapter while not using up any space in a nacelle. Placing components in the tower adapter instead of the nacelle is also advantageous since it lowers the center of gravity and reduces the load on moving components for example, a yaw drive of the nacelle. All new components as well as previously mentioned components can be easily placed in the tower adapter. In an embodiment, they can be integrated in the tower adapter as a module, as part of the insert module housing the electrical components discussed below. The additional components can be housed on the same tower adapter platform as the electrical components and/or mechanical equipment and/or on a separate platform.

A battery back-up device can be used to power components of the wind turbine when the generator of the wind turbine does not provide any or not enough power. This avoids the use of external power when starting or shutting down the wind turbine or during servicing. The battery back-up device can be used to a power the mentioned electrical devices. Additionally, or alternatively, it can power a yaw drive of a nacelle, yaw drives of the rotor blades, drive the generator to overcome a friction during start up, etc.

The controller can be used to control parameters of the mentioned electrical devices, of converters, to condition the power provided by the generator such that it is compatible with the power requirement of internal components and/or an external facility. It can also be used to control the yaw drive of the nacelle, the yaw angle of the blades, etc. depending on an external power requirement, weather conditions, for example, wind speed, and other operating parameters.

The cooling equipment can be used to cool the mentioned electrical devices, especially the power converters.

The use of one or multiple platforms within the tower adapter is advantageous since it can facilitate access for service personal and/or provide space for attaching the electrical device or devices or other components.

The tower adapter can be connected to the tower by a slip joint or a flange connection. A slip joint can be formed by shaping the lower end of tower adapter as a hollow tube and by using a tower with a slightly smaller diameter than the inner diameter of this hollow tube. The hollow tube can than slip along the outside of the tower during the connection. It is also possible to use a tower that forms a hollow tube and to slide a tower adapter with a slightly lower diameter into this hollow tube.

If the hollow tube and the inserted part of the other component are approximately cylindrical, a stopper is needed to limit the sliding of the tower adapter downwards along or within the tower. This is however not necessary when the tower and optionally the lower end of the tower adapter have a conical shape. Since the tower widens towards the bottom, a hollow tube formed by the tower adapter can also slide for a certain distance before the diameter of the tower exceeds the diameter of the opening and therefore a further sliding of the tower adapter is avoided.

The advantage of using a slip joint is, that the attachment of a tower adapter to the tower is already accomplished by the weight of the tower adapter and the nacelle itself and therefore a bolting or welding of the tower adapter to the tower is not strictly necessary.

Various implementations of slip joints are already known from the conventional art, the documents EP 2 910 686 A2 and EP 3 255 210 A2. These approaches or other approaches for implementing a slip joint can be used to connect the tower adapter to the tower in the discussed wind turbine.

An alternative to the use of a slip joint would be the use of a flange connection formed by flanges connected by welding, gluing or bolting. The flange can be a T flange, an L flange, an X flange or any other type of flange. Especially for bolding it is possible to provide a respective inside or outside flange to the tower adapter and to the top of the tower. Optionally grouting can be used in a connection area.

It is also possible to use a slip joint to connect the tower to a foundation of the wind turbine. With this approach the assembly of the wind turbine can be further accelerated.

The tower adapter can house an insert module comprising at least two tower adapter platforms connected by a connection element, wherein at least one of the tower adapter platforms carries the electrical device or at least one of the electrical devices. This can further reduce the effort required to construct the wind turbine. The insert module can be used to pre-install and test the electrical devices and other devices to be arranged in the tower adapter. The completed insert module can then be inserted in the tower adapter.

It is possible that the side wall of the transition piece comprises protrusions that support one or more of the tower adapter platforms once the insertion module is inserted from the top into the tower adapter prior to the connection of the tower adapter with the nacelle. It is however also possible that the insert module is inserted into the tower adapter after the tower adapter is connected to the nacelle. It is possible that the tower adapter is open at the bottom and the insert module is inserted into the tower adapter from below by lowering the tower adapter above the insert module, and then fixed to the tower adapter by welding, bolzing, gluing, etc.

Insert modules carrying electrical components which are installed inside a tower are already known from the documents DE 10 2016 219 413 A1 and WO 2018/133965 A1. By providing a matching attachment structure in the tower adapter such insert modules can also be used with a tower adapter.

The inert module or more generally the tower adapter can also house storage space, for example, for a food supply, emergency accommodations for service personal and/or mechanical devices, a vibration damper for the tower.

The use of a tower adapter and the integration of at least part of the power conditioning and/or switching gear into the tower adapter and especially the integration of all switch gear and power conditioning gear in the nacelle and the tower adapter allows for several advantages. The complete electronics in the tower adapter and nacelle can be pre-fitted and tested from switch gear and up. After the installation of the tower adapter with the attached nacelle the only other electrical installation can be limited to connecting power cables and/or communication cables between the tower and the tower adapter. In an embodiment, all components that might require servicing can be moved from the tower to the nacelle or the tower adapter. Besides the already discussed components this might also include dampers to reduce tower vibrations etc.

This approach also allows for a very clean design of the tower and foundation for example, a monopile. Except for the power and/or communication cable or a plastic tube or other housing for these cables, the tower and foundation can be empty. Since an access of personal to the inside of the tower is not necessary, the tower can be air tight below a certain point, below the service platform discussed above. This also allows to limit the coated area of the tower and the foundation. It is possible to only coat the outside of the tower to avoid corrosion, since the inside is closed off from air. In case of a monopile the foundation can only be coated in the top area.

Embodiments of the invention also concern a method for constructing a wind turbine, wherein a tower adapter that is connected to a nacelle of the wind turbine and that houses at least one electrical device of the wind turbine for conditioning or switching power provided by a generator of the wind turbine is attached to a provided tower of the wind turbine. The tower is already mounted to a foundation of the wind turbine. Features of the wind turbine according to embodiments of the present invention and especially the discussed features concerning the construction of the wind turbine can be incorporated into the method according to embodiments of the present invention. A method according to embodiments of the present invention can especially be used to construct a wind turbine according to embodiments of the present invention.

The wind turbine can be an offshore wind turbine, wherein the electrical device or devices installed in a tower adapter are tested onshore before transferring the tower adapter to the offshore location of the tower. This reduces the complexity of offshore operations and therefore the cost and complexity of installing the wind turbine. This can reduce the amount of installation and especially the amount of necessary electrical connections performed offshore. The installation of the devices in the tower adapter can be performed in a controlled environment, for example, in a factory.

At least one power and/or communication cable can be pre-installed in the tower and connected to a connector of the tower adapter after the tower adapter is mounted to the tower. This was already discussed in detail previously. In an embodiment, the power and/or communication cable is installed onshore before the tower is shipped to a prepared offshore foundation. The connector of the tower adapter can be a connector that is connected to at least one of the electrical devices via a cable and is mounted to an easily reachable position of the tower adapter. It is however also possible for the connector of the tower adapter to be implemented directly by an electrical device, for example, a switch gear, housed in the tower adapter. In other words, the pre-installed cable can be directly connected to one of the electrical devices or to other equipment housed in the tower adapter. A direct routing of the cables to the switch gear can be a fast and simple way to provide an offshore electrical installation.

It is also possible to pre-install multiple power and/or communication cables in the tower and connect them to a common connector attached to the tower prior to the mounting of the tower adapter on the tower, wherein multiple further cables attached to the electrical devices, especially to switch gear, are connected to the common connector after the tower adapter is mounted to the tower. The common connector can be a junction box that terminates all array cables. The further cables can be jump cables that are pre-installed to the switch gear in the tower adapter. The complete power connection of the nacelle and tower adapter to the tower can then be achieved by a simple plug-and-play connection of the further cables to the common connector. The connection of the further cables can be achieved by providing each of the further cables with a separate connector or by using a further common connector.

BRIEF DESCRIPTION

Some of the embodiments will be described in detail, with reference to the following figures, wherein like designations denote like members, wherein.

DETAILED DESCRIPTION

Figure 1:
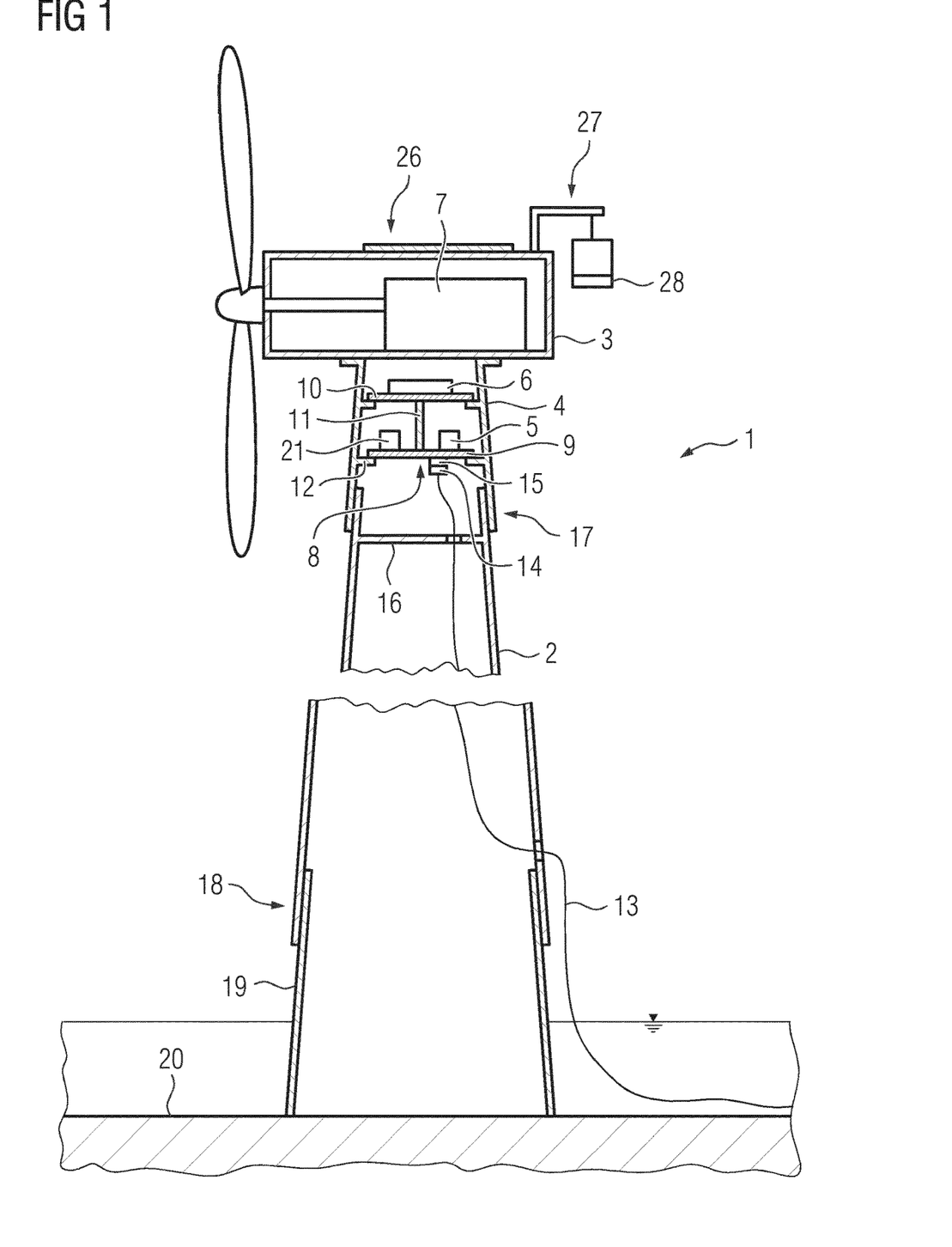
FIG. 1 shows an exemplary embodiment of the wind turbine according to embodiments of the present invention.

FIG. 1 shows a wind turbine 1 with a tower 2 and a nacelle 3. In the example an offshore wind turbine is shown, that is attached to a seafloor 20 via the foundation 19. While the discussed approach for reducing the complexity of constructing a wind turbine is especially advantageous for offshore wind turbines, it can also be advantageously used for onshore wind turbines.

The wind turbine 1 comprises a tower adapter 4 that connects the tower 2 to a nacelle 3. The tower adapter 4 houses multiple electrical devices 5, 6 used for conditioning and switching the power provided by the generator 7. For reasons of clarity only two of the devices 5, 6 are shown. It is however advantageous to install all components for switching and conditioning the power of the generator 7 within the tower adapter 4 or within the tower adapter 4 and the nacelle 3.

The devices 5, 6 can include switch gear, at least one converter and/or at least one transformer. The conditioning of the power is performed to provide a power with the necessary parameters to internal equipment and via the power cable 13 to an external facility, for example, a substation of an offshore wind park, an onshore facility etc. While only a single power cable 13 is shown that connects the wind turbine 1 to an external facility, this limitation is only due to clarity. Typically, the wind turbine 1 will be connected by multiple power cables 13 and typically also by at least one communication cable. For the further power cables 13 and the communication cables the following discussion concerning the connection of the power cable 13 also holds true.

The electrical devices 5, 6 can already be installed within the tower adapter 4 before the tower adapter 4 is connected to the tower 2. It is also advantageous to connect the nacelle 3 to the tower adapter before the tower adapter 4 is connected to the tower 2. The installation of the electrical devices 5, 6 and optionally also the connection between tower adapter 4 and nacelle 3 can be performed onshore.

To allow for an easy installation of the devices 5, 6 within the tower adapter 4 the devices 5, 6 can be installed as a pre-configured insert module 8 that can be pre-assembled and tested before attaching it to the tower adapter 4. The insert module 8 comprises multiple tower adapter platforms 9, 10 and a connection element 11 connecting these platforms. The electrical devices 5, 6 used for the conditioning and switching of the power provided by the generator 7 can be pre-installed on these platforms 9, 10. It is also possible to install additional equipment 21 used to operate the wind turbine 1, for example a battery back-up device, cooling equipment, a controller of the wind turbine, etc. onto these platforms 9, 10 or on other parts of the insert module 8 or the tower adapter 4.

The insert module 8 is inserted into the tower adapter 4 from the top before the nacelle 3 is attached to the top of the tower adapter 4. Protrusions 12 in the wall of the tower adapter 4 can than support the platforms 9, 10. While it can be advantageous to bolt or otherwise fix the platforms 9, 10 to the protrusions 12 or otherwise fixed the inside module 8 to the walls of the tower adapter 4, a major part of the load of the insert module 8 is already carried by the protrusions 12 therefore simplifying the attachment of the insert module 8 to the tower adapter 4. Slip joints 17, 18 are used to connect the tower 2 to the foundation 19 and the tower adapter 4 to the tower 2. This allows for a very fast and easy installation of these components. Since the electrical devices 5, 6 and other equipment 21 is already pre-installed and tested within the tower adapter 4 only a very limited electrical installation is necessary on site. This is especially true if the nacelle 3 is already connected to the tower adapter 4 onshore, since in this case only a connection to power cables 13 or communication cables to external facilities needs to be completed. These power cables 13 and communication cables can be provided with a connector 14 that connects to a connector 15 of the tower adapter 4. To allow for an easy access to this connection the tower 2 can be provided with a service platform 16 which allows easy access for service personal to the connectors 14, 15 and optionally other equipment installed below the platform 9.

Details concerning the attachment of the tower adapter 4 to the tower 2 are now discussed with reference to FIG. 2. While FIG. 2 shows a slightly different configuration of a nacelle 3 and the tower adapter 4, both embodiments are based on the same principals and individual features can be freely transferred between the embodiments.

Figure 2:
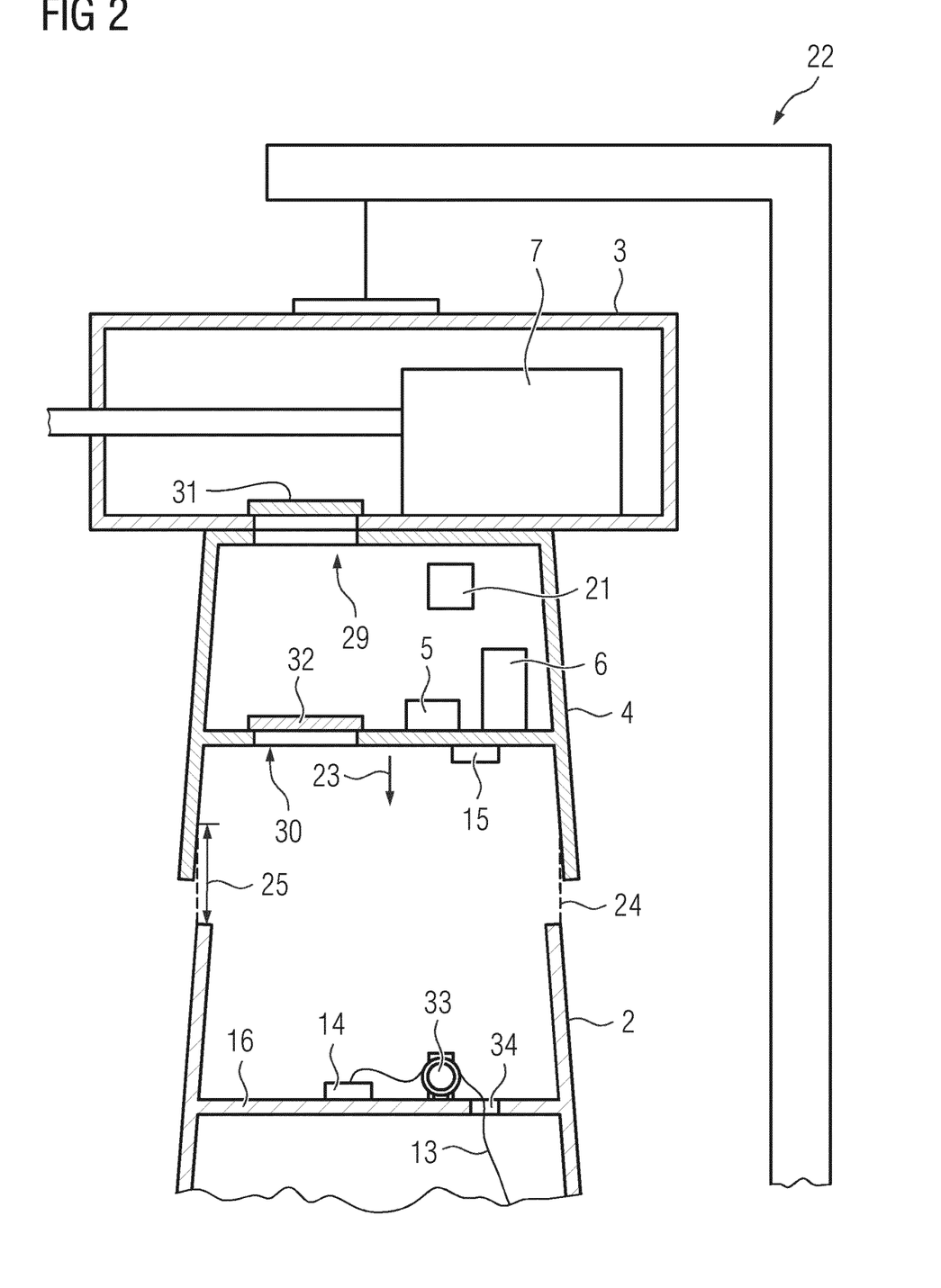
FIG. 2 shows an intermediate step of an exemplary embodiment of a method for constructing a wind turbine according to embodiments of the present invention.

In the embodiment shown in FIG. 2 the tower adapter 4 is not yet attached to the tower 2. It is however already connected to the nacelle 3 and the resulting combination of these two components is lifted by the crane 22 onto the top of the tower 2. The tower adapter 4 is lowered as shown by the arrow 23. At some point the outer diameter of the top of the tower 2 will be larger than the inner diameter of the tower adapter 4 as indicated by the dashed lines 24. The distance 25 that the tower adapter 4 needs to be lifted above its final resting position to attach it to the tower is relatively small. Therefore, the requirements concerning the crane 22 are limited. The small distance 25 also limits the potential damage if the tower adapter 4 should drop due to a malfunction of the crane 22.

Due to the conical shape of the tower 2 and the tower adapter 4 the opening on the bottom of the tower adapter 4 is relatively wide. Therefore, the positioning of the tower adapter 4 and the nacelle 3 above the tower 2 does not need to be perfect but only with a certain amount of tolerance. Once the inner walls of the tower adapter 4 contact the outer walls of the tower 2 the tower adapter 4 will automatically be centered and therefore end up in a perfect position even if the initial positioning is within a certain tolerance.

Once the tower adapter 4 is lowered onto the tower the finalising steps can be performed by personal that can be transferred to the nacelle by a helicopter or by a crane lifting a platform 28. The example in FIG. 1 shows a landing spot 26 for personal landing via a helicopter and a crane 27 of the nacelle 3 that can be used to lift and lower the platform 28 to raise personal from a boat. Once the personal is in the nacelle 3 it can access the interior of the tower adapter 4 via the opening 29 and from there the service platform 16 via the opening 30. The openings 29, 30 can be closed by hatches 31, 32 or similar devices.

As already discussed with reference to FIG. 1 the tower adapter 4 includes electrical devises 5, 6 for conditioning or switching power provided by the generator 7 and further components 21. Instead of installing these components via an insert module 8 as discussed with respect to FIG. 1, FIG. 2 shows an example of these components being directly installed within the tower adapter 4. This configuration also allows a testing of the components onshore in the installed position.

The power cable 13 as well as any other power cables or communication cables can be pre-installed in the tower 2, preferably onshore. The free end of the cable 13 with its connector 14 can be attached to a cable holder 33 installed in such a way that it is easily reachable from the service platform 16. Once the tower adapter 4 is lowered onto the tower 2, service personal can reach the service platform 16 via the openings 29, 30, remove the cable 13 from the cable holder 33 and attach the connector 14 to the connector 15. Once all cables are connected, the installation of the wind turbine is complete. This allows for a very fast installation of a wind turbine.

It can be advantageous to close the openings 34 for the cables 13 in an air tight manner to close of the interior of the tower 2 below the service platform 16 against air. This can be used to avoid corrosion of the tower 2, even when the tower 2 is not coated on its interior.

Figure 3:
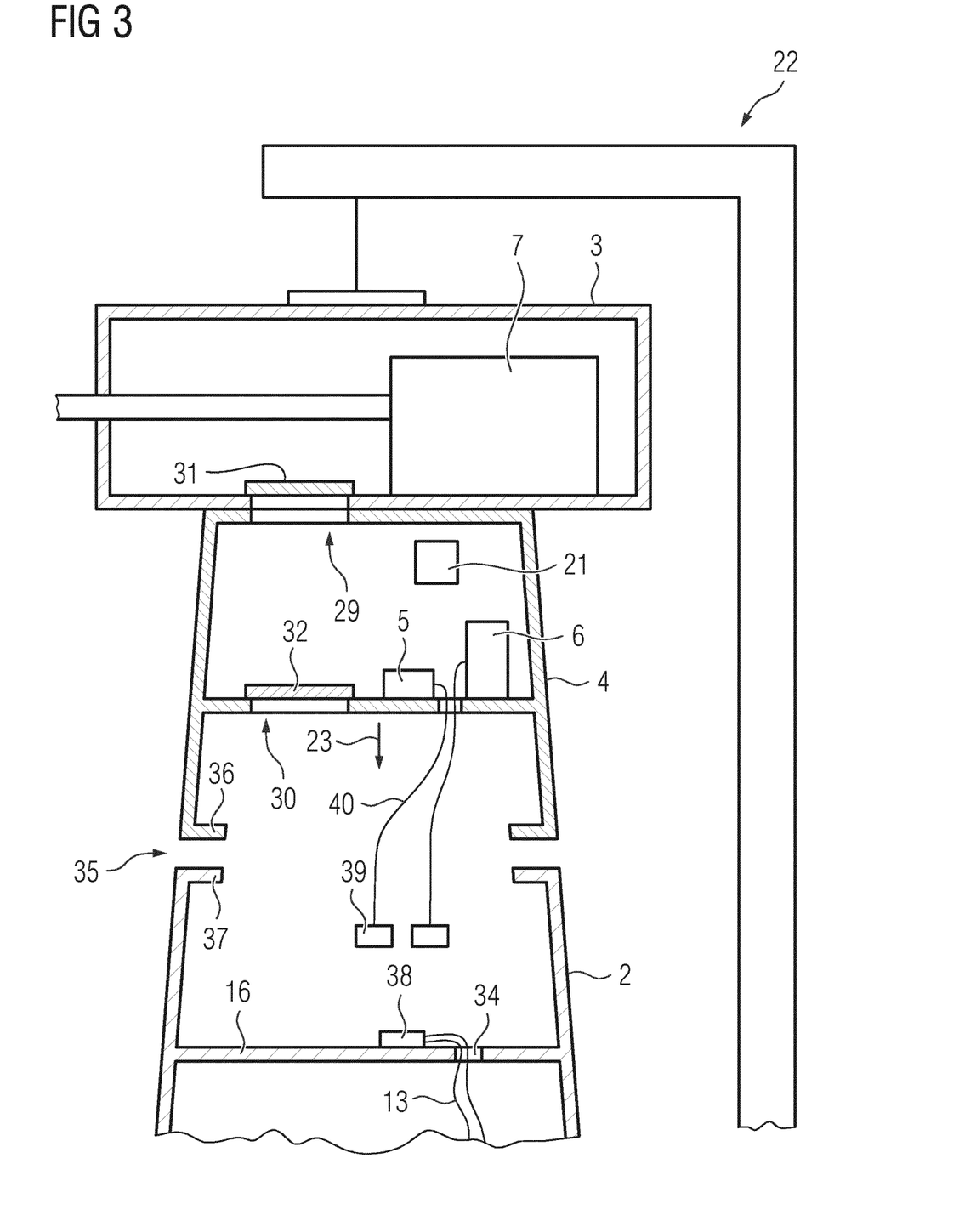
FIG. 3 shows the intermediate step shown in FIG. 2 for another exemplary embodiment of a method for constructing a wind turbine according to embodiments of the present invention.

A slight variation of the method discussed in the previous embodiments is now discussed with reference to FIG. 3. FIG. 3 shows essentially the same situation as shown in FIG. 2 with some minor modifications. Therefore, only the differences between the two examples will be discussed.

Instead of the slip joint 17 used in the previous examples to connect the tower adapter 4 to the tower 2, a flange connection 35 is used in FIG. 3. The tower adapter is arranged by the crane 22 such that the flange 36 of the tower adapter 4 overlaps the flange 37 of the tower 2. The flanges 36, 37 can then be connected by bolting or welding, to fix the tower adapter 4 to the tower 2.

In the example inside flanges 36, 37 are used for the connection. Service personal can access these flanges 36, 37 from the service platform 16. Alternatively, it would be possible to use outside flanges.

FIG. 3 also shows an approach for further streamlining the connection of multiple cables 13 to the tower adapter. Multiple cables 13, for example, all array cables for the wind turbine 1, can be preinstalled in the tower 2 and connected to a common connector 38 or junction box. Further cables 40 can then be pre-installed on electrical devices 5, 6 housed in the tower adapter 4, especially switch gear, and provided with a respective connector 39 or a common connector connected to all further cables 40. Once the tower adapter 4 is attached to the tower the electrical installation can then simply be completed by connecting the connectors 39 or a common connector for the further cables 40 to the common connector 38 mounted to the tower. Please note that while FIG. 3 shows freely hanging further cables 40 for reasons of clarity, those cables 40 will typically be fixed to the tower adapter during installation, by a cable holder.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
a tower;
a tower adapter attached to the tower; and
a nacelle attached to the tower adapter, wherein the tower adapter houses at least one electrical device of the wind turbine for conditioning or switching power provided by a generator of the wind turbine;
wherein the tower adapter is connected to the tower by a slip joint or a flange connection, and when connected to the tower, the tower adapter forms an external wall structure of the wind turbine from the tower to the nacelle.

2. The wind turbine according to claim 1, wherein a switch gear and/or a converter and/or a transformer are housed in the tower adapter as electrical equipment.

3. The wind turbine according to claim 1, wherein the wind turbine comprises at least one power cable for transferring the power generated by the generator to an external facility and/or a communication cable for communication with the external facility, further wherein the power cable and/or the communication cable terminate in the tower adapter or in a connector that is attached to the tower and connected to a further cable that is connected to at least one electrical device housed in the tower adapter.

4. The wind turbine according to claim 3, wherein the tower comprises a cable holder below the tower adapter for holding the power and/or communication cable prior to the installation of the tower adapter.

5. The wind turbine according to claim 1, wherein the tower comprises a service platform below the tower adapter that is accessible via an opening in the tower adapter.

6. The wind turbine according to claim 1, further comprising an opening connecting the nacelle to the tower adapter.

7. The wind turbine according to claim 1, wherein the tower adapter further houses a battery back-up device and/or cooling equipment and/or a cable support to support the power and/or communication cable and/or a controller and/or a tower adapter platform.

8. The wind turbine according to claim 1, wherein the tower adapter houses an insert module comprising at least two tower adapter platforms connected by a connection element, further wherein at least one of the tower adapter platforms carries the electrical device or at least one of the electrical devices.

9. A method for constructing a wind turbine, wherein a tower adapter that is connected to a nacelle of the wind turbine and that houses at least one electrical device of the wind turbine for conditioning or switching power provided by a generator of the wind turbine is attached to a provided tower of the wind turbine, further wherein the tower adapter is connected to the tower by a slip joint or a flange connection, and when connected to the tower, the tower adapter forms an external wall structure of the wind turbine from the tower to the nacelle.

10. The method according to claim 9, wherein the wind turbine is an offshore wind turbine, and the electrical device or devices installed in the tower adapter are tested onshore before transferring the tower adapter to the offshore location of the tower.

11. The method according to claim 9, wherein at least one power and/or communication cable is pre-installed in the tower and connected to a connector of the tower adapter after the tower adapter is mounted to the tower.

12. The method according to claim 9, wherein multiple power and/or communication cables are pre-installed in the tower and connected to a common connector attached to the tower prior to the mounting of the tower adapter on the tower, wherein multiple further cables attached to the electrical devices, especially to a switch gear, are connected to the common connector after the tower adapter is mounted to the tower.

* * * * *